(12) United States Patent
Ominato et al.

(10) Patent No.: US 10,871,604 B2
(45) Date of Patent: Dec. 22, 2020

(54) DISPLAY DEVICE AND IMAGE FORMING APPARATUS

(71) Applicant: Brother Kogyo Kabushiki Kaisha, Nagoya (JP)

(72) Inventors: Hiroyuki Ominato, Nagoya (JP); Toshio Sakai, Nagoya (JP); Yohei Hashimoto, Nagakute (JP); Masao Ichiyanagi, Ama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/830,593

(22) Filed: Mar. 26, 2020

(65) Prior Publication Data

US 2020/0310021 A1 Oct. 1, 2020

(30) Foreign Application Priority Data

Apr. 1, 2019 (JP) ................................ 2019-069842

(51) Int. Cl.
*G02B 1/00* (2006.01)
*F21V 8/00* (2006.01)

(52) U.S. Cl.
CPC ......... *G02B 6/0036* (2013.01); *G02B 6/0021* (2013.01); *G02B 6/0046* (2013.01); *G02B 6/0073* (2013.01)

(58) Field of Classification Search
CPC ........................... G02B 6/0046; G02B 6/0073
See application file for complete search history.

(56) References Cited

U.S. PATENT DOCUMENTS 9,459,396 B1 * 10/2016 Householder ........ G02B 6/0058

FOREIGN PATENT DOCUMENTS

| JP | H06-265732 A | 9/1994 |
|---|---|---|
| JP | H06-273754 A | 9/1994 |
| JP | 2000098377 A | 4/2000 |
| JP | 2000292622 A | 10/2000 |
| JP | 2011198541 A | 10/2011 |

\* cited by examiner

*Primary Examiner* — Robert J May
(74) *Attorney, Agent, or Firm* — Baker Botts L.L.P.

(57) ABSTRACT

A display device includes a light guide member, a light source substrate and a liquid crystal panel. The light guide member has a first incidence surface, and an emission surface orthogonal to the first incidence surface. The light source substrate has a light source emitting light toward the first incidence surface, and a substrate on which the light source is arranged. The liquid crystal panel has a second incidence surface arranged to be inclined relative to a surface of the substrate in a position where the liquid crystal panel faces the emission surface of the light guide member. A second angle between the emission surface and the surface of the substrate is greater than 0°, and is equal to or smaller than a first angle between the second incidence surface and the surface of the substrate.

9 Claims, 6 Drawing Sheets

DISPLAY DEVICE AND IMAGE FORMING APPARATUS

CROSS-REFERENCE TO RELATED APPLICATION

This application is based upon and claims the benefit of priority from prior Japanese patent application No. 2019-069842, filed on Apr. 1, 2019, the entire contents of which are incorporated herein by reference.

TECHNICAL FIELD

The present disclosure relates to a display device and an image forming apparatus.

BACKGROUND

A recent image forming apparatus is provided with a display device for which a liquid crystal panel is used. In the display device for which the liquid crystal panel is used, emission light from a light source (i.e., backlight) provided on a substrate is guided to the liquid crystal panel by a light guide member.

In order to suppress a thickness of the display device, known is a configuration in which the backlight is arranged on a side surface of the light guide member. In the configuration, technology of suppressing variations in luminance by a wedge-shaped section of the light guide member is known (refer to JP-A-2000-098377).

The liquid crystal panel is arranged to be inclined relative to the substrate, in some image forming apparatuses. In the configuration, distances of the light source arranged on the substrate to a lower part and an upper part of inclination of the liquid crystal panel are different. For this reason, variations in luminance is likely to occur. Also, even when the light guide member having a wedge-shaped section is used, the variations in luminance cannot be suppressed.

SUMMARY

An object of the present disclosure is to provide a display device and an image forming apparatus capable of arranging a liquid crystal panel with inclination while suppressing variations in luminance.

An aspect of the present disclosure is a display device (3) including a light guide member (32) having a first incidence surface (32A), and an emission surface (32B) orthogonal to the first incidence surface (32A), a light source substrate (31) having a light source (31A) that emits light toward the first incidence surface (32A) of the light guide member (32), and a substrate (31B) on which the light source (31A) is arranged, and a liquid crystal panel (33) having a second incidence surface (33A) arranged to be inclined relative to a surface (31C) of the substrate (31B) in a position where the liquid crystal panel (33) faces the emission surface (32B) of the light guide member (32).

The light guide member (32) has convex light diffusion portions (32D) arranged on the emission surface (32B), and has a constant thickness in an optical axis direction of the light source (31A). The light diffusion portions (32D) of the light guide member (32) are spaced from the liquid crystal panel (33).

A second angle between the emission surface (32B) of the light guide member (32) and the surface (31C) of the substrate (31B) is greater than 0°, and is equal to or smaller than a first angle between the second incidence surface (33A) of the liquid crystal panel (33) and the surface (31C) of the substrate (31B).

According to the above configuration, since the emission surface (32B) of the light guide member (32) is arranged to be inclined relative to the substrate (31B) toward the liquid crystal panel (33), it is possible to reduce a difference of distances from each of a lower part and an upper part of inclination of the liquid crystal panel (33) to the emission surface (32B). As a result, while suppressing variations in luminance, it is possible to arrange the liquid crystal panel (33) to be inclined relative to the light source substrate (31).

Since the light diffusion portions (32D) of the light guide member (32) re arranged with being spaced from the liquid crystal panel (33), an unevenness shape due to the light diffusion portions (32D) is suppressed from being visually recognized through the liquid crystal panel (33). For this reason, it is possible to improve an appearance of a display part of the display device (3).

In the meantime, the reference signs in the parentheses of the respective means and the like indicate exemplary correspondence relations with the specific means and the like described in the embodiment, and the present disclosure is not limited to the specific means and the like denoted with the reference signs in the parentheses of the respective means and the like.

DETAILED DESCRIPTION

The present disclosure described below provides an embodiment by way of example. That is, subject matters and the like of the invention defined in the claims are not limited to the specific means, structures and the like described in the embodiment.

Arrows and the like indicative of directions in the respective drawings showing the present embodiment are provided so as to easily understand the mutual relation of the respective drawings. The present disclosure is not limited to the directions shown in the respective drawings.

At least one member or part is provided for those denoted at least by reference signs, unless otherwise specified, for example, as "plurality", "two or more" and the like. Hereinbelow, the embodiment of the present disclosure will be described with reference to the drawings.

1. First Embodiment

[1-1. Configuration]

Figure 1:
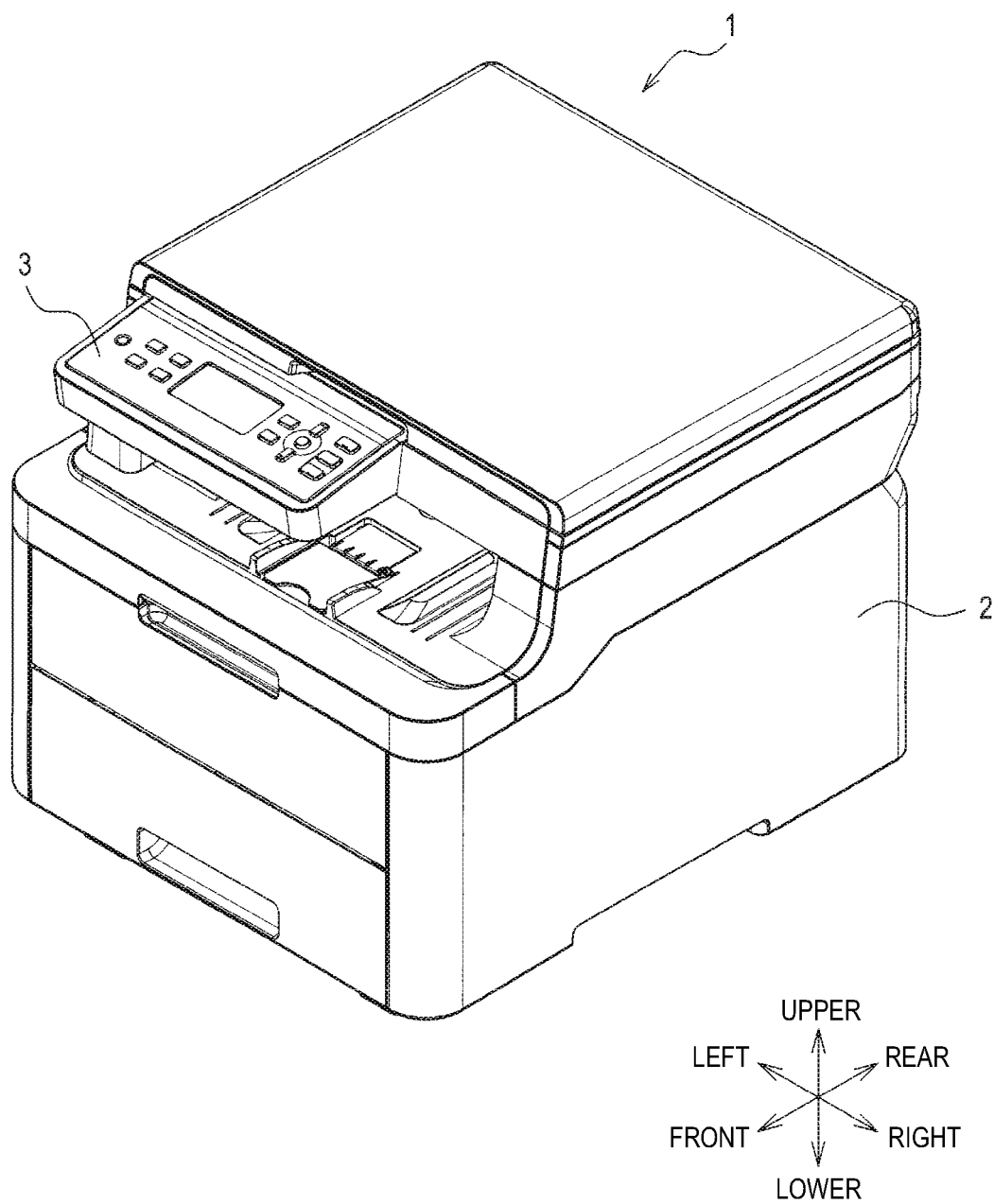
FIG. 1 is a pictorial perspective view of an image forming apparatus in accordance with an embodiment.

An image forming apparatus 1 shown in FIG. 1 includes a printer 2, and a display device 3.

<Printer>

The printer 2 includes a sheet discharge tray, a sheet feeding tray, an image forming unit, a frame, and the like. The printer 2 is configured to form an image on a sheet arranged in the sheet feeding tray by the image forming unit, and to discharge the sheet onto the sheet discharge tray.

<Display Device>

The display device 3 has a display function of displaying information about the printer 2, and an input function of inputting an operation on the printer 2.

Figure 2:
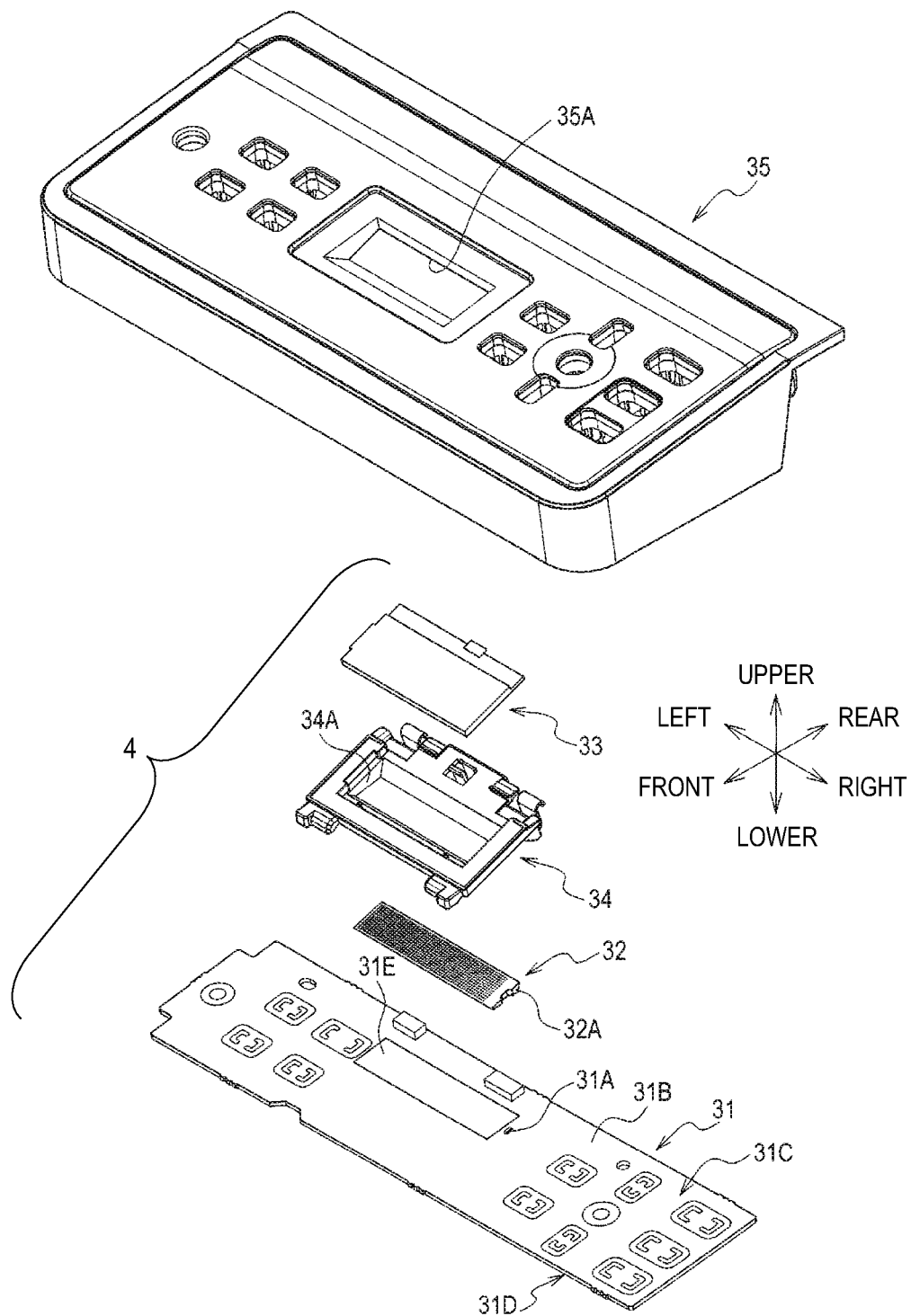
FIG. 2 is a pictorial exploded perspective view of a display device of FIG. 1.

The display device 3 is arranged on a front and upper side of the printer 2. As shown in FIG. 2, the display device 3 includes a display body 4 and a case 35. The display body 4 includes a light source substrate 31, a light guide member 32, a liquid crystal panel 33, and a frame 34.

(Light Source Substrate)

The light source substrate 31 includes a light source 31A configured by an LED (light-emitting diode), and a substrate 31B having the light source 31A arranged thereon.

The light source 31A is configured to supply light to the liquid crystal panel 33, which will be described later. Specifically, the light source 31A is configured to emit light toward a first incidence surface 32A of the light guide member 32, which will be described later. In the present embodiment, an optical axis direction of the light source 31A is a right and left direction, and is parallel to a normal direction of the first incidence surface 32A, which will be described later.

The substrate 31B is configured to feed power to the light source 31A mounted thereto, and to control drive of the liquid crystal panel 33. Also, the substrate 31B has a circuit configured to process an input operation to the display device 3.

The substrate 31B has a surface 31C, a rear surface 31D, and a white part 31E. The light source 31A is arranged on the surface 31C. Also, the light guide member 32 and the liquid crystal panel 33 are arranged on the surface 31C-side of the substrate 31B. In the present embodiment, the surface 31C and the rear surface 31D of the substrate 31B are parallel to a horizontal direction, and the substrate 31B is arranged so that the surface 31C faces upward.

The white part 31E is a part of the surface 31C of the substrate 31B, which is colored by white. The white part 31E is provided on the surface 31C in a region where at least the light guide member 32, which will be described later, overlays the surface 31C.

(Light Guide Member)

Figure 3A:
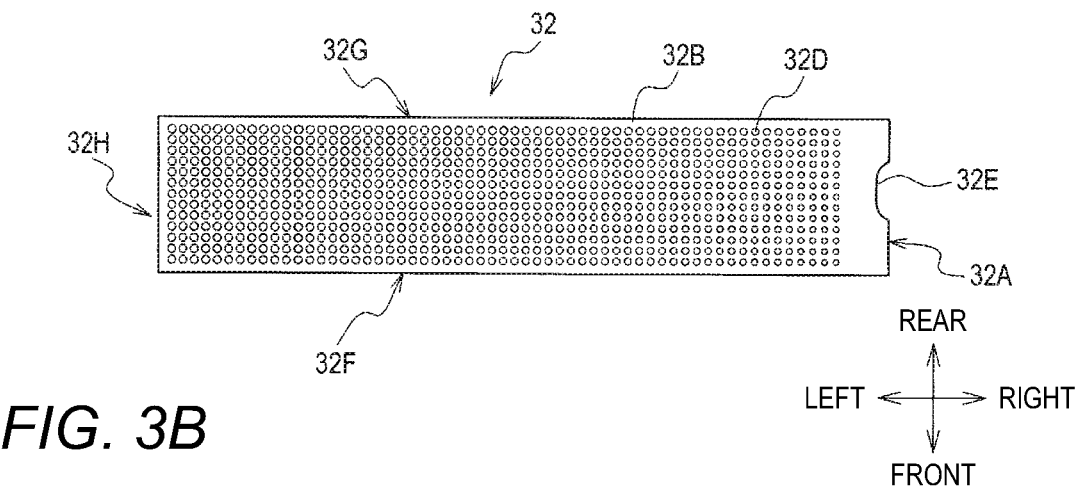
FIG. 3A is a pictorial plan view of a light guide member of FIG. 2.
Figure 3B:
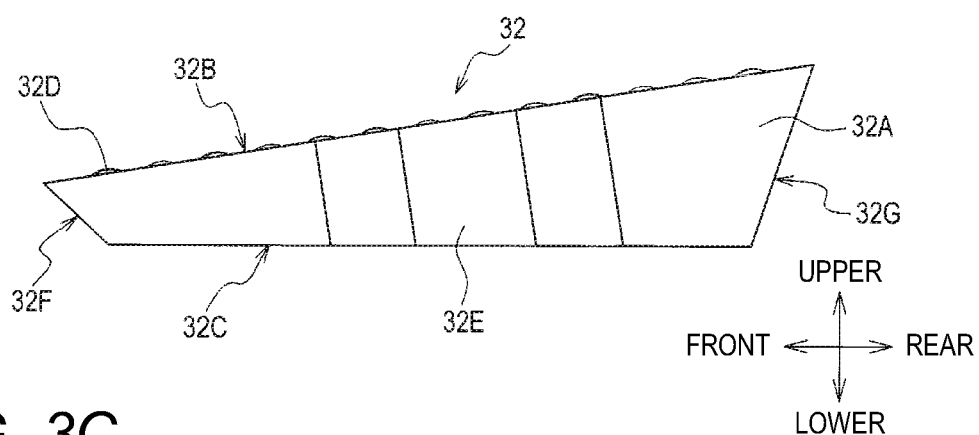
FIG. 3B is a pictorial side view of the light guide member of FIG. 2.

The light guide member 32 is a hexahedron-shaped member configured to guide the light from the light source 31A to the liquid crystal panel 33 while diffusing the light. As shown in FIGS. 3A and 3B, the light guide member 32 has a first incidence surface 32A, an emission surface 32B, a facing surface 32C, light diffusion portions 32D, and a concave portion 32E.

The first incidence surface 32A is a surface arranged with facing the light source 31A. The light emitted from the light source 31A is introduced from the first incidence surface 32A into the light guide member 32. In the present embodiment, the first incidence surface 32A is parallel in an orthogonal direction and a front and rear direction. Also, the first incidence surface 32A is provided with the concave portion 32E, which will be described later.

The emission surface 32B is a surface orthogonal to the first incidence surface 32A. The light introduced from the first incidence surface 32A into the light guide member 32 is emitted from the emission surface 32B toward the liquid crystal panel 33. In the present embodiment, the emission surface 32B is parallel to the right and left direction and intersects with the orthogonal direction and the front and rear direction. The emission surface 32B is arranged thereon with the light diffusion portions 32D, which will be described later.

The facing surface 32C is a surface placed on the surface 31C of the substrate 31B of the light source substrate 31. The facing surface 32C is orthogonal to the first incidence surface 32A, is inclined relative to the emission surface 32B, and is parallel to the surface 31C of the substrate 31B. That is, in the present embodiment, the facing surface 32C is parallel to the horizontal direction. In the meantime, a gap may be provided between the facing surface 32C and the surface 31C.

The white part 31E of the substrate 31B is provided in a region of the surface 31C facing the facing surface 32C. Also, an area of the facing surface 32C is smaller than an area of the emission surface 32B. For this reason, a first side surface 32F on a front side and a second side surface 32G on a rear side of the light guide member 32 are inclined so as to come close to each other from the emission surface 32B toward the facing surface 32C.

The light guide member 32 has a constant thickness in the optical axis direction of the light source 31A. That is, a sectional shape of the light guide member 32 perpendicular to the optical axis of the light source 31A is constant, irrespective of a distance from the first incidence surface 32A. In the meantime, the thickness of the light guide member 32 means a distance in the orthogonal direction from the facing surface 32C to the emission surface 32B, and a thickness of the light diffusion portion 32D (i.e., a protruding amount of the light diffusion portion 32D) (which will be described later) is not considered.

The light diffusion portions 32D are convex portions arranged on the emission surface 32B. Specifically, the light diffusion portions 32D are configured by a plurality of convex portions protruding from the emission surface 32B toward the liquid crystal panel 33. Also, the light diffusion portions 32D are arranged with being spaced from the liquid crystal panel 33. That is, an air layer is provided between the light guide member 32 and the liquid crystal panel 33.

In FIGS. 3A and 3B, the light diffusion portions 32D are configured as portions of spheres (i.e., planar shapes thereof are circular). However, the shape of the light diffusion portion 32D is not limited thereto. Also, the light diffusion portions 32D are not necessarily required to be arranged with constant pitches in a lattice shape.

The concave portion 32E is provided in a region of the first incidence surface 32A close to the light source 31A and facing the light source 31A. The concave portion 32E includes a surface orthogonal to the facing surface 32C (i.e., a surface parallel to the orthogonal direction). The concave portion 32E is formed by recessing inwards a portion of the first incidence surface 32A.

In the present embodiment, the concave portion 32E is formed to range from the emission surface 32B to the facing surface 32C. Also, the concave portion 32E is a notch having a C-shaped outline, as seen in the normal direction of the emission surface 32B. The light emitted from the light source 31A mainly passes through the concave portion 32E and is diffused into the light guide member 32.

Figure 3C:
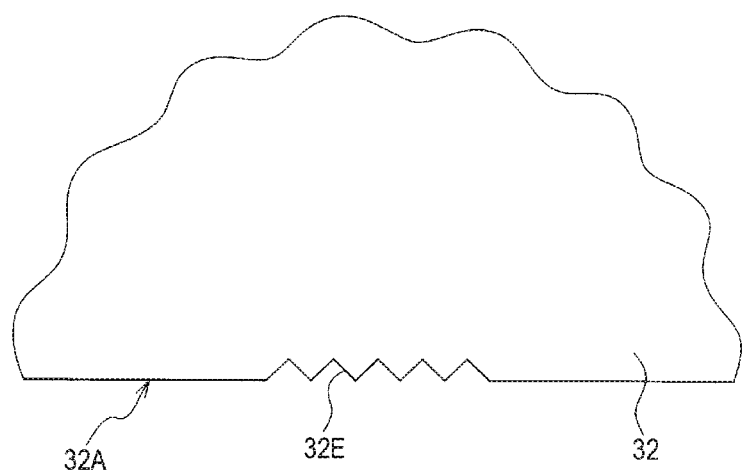
FIG. 3C is a pictorial partial enlarged view of a light guide member of an embodiment different from FIGS. 3A and 3B.

The shape of the concave portion 32E shown in FIGS. 3A and 3B is an example. As shown in FIG. 3C, the light guide member 32 may have a concave portion 32E configured by a plurality of grooves connected in a wave shape, as seen in the normal direction of the emission surface 32B.

(Liquid Crystal Panel)

The liquid crystal panel 33 includes a panel body having a liquid crystal layer, and a diffusion sheet. The panel body has a liquid crystal layer, two substrates between which the liquid crystal layer is sandwiched, and a polarization plate, for example. The diffusion sheet is stacked on a surface of the panel body facing toward the light guide member 32. That is, the diffusion sheet is arranged between the panel body and the light guide member 32.

Figure 4A:
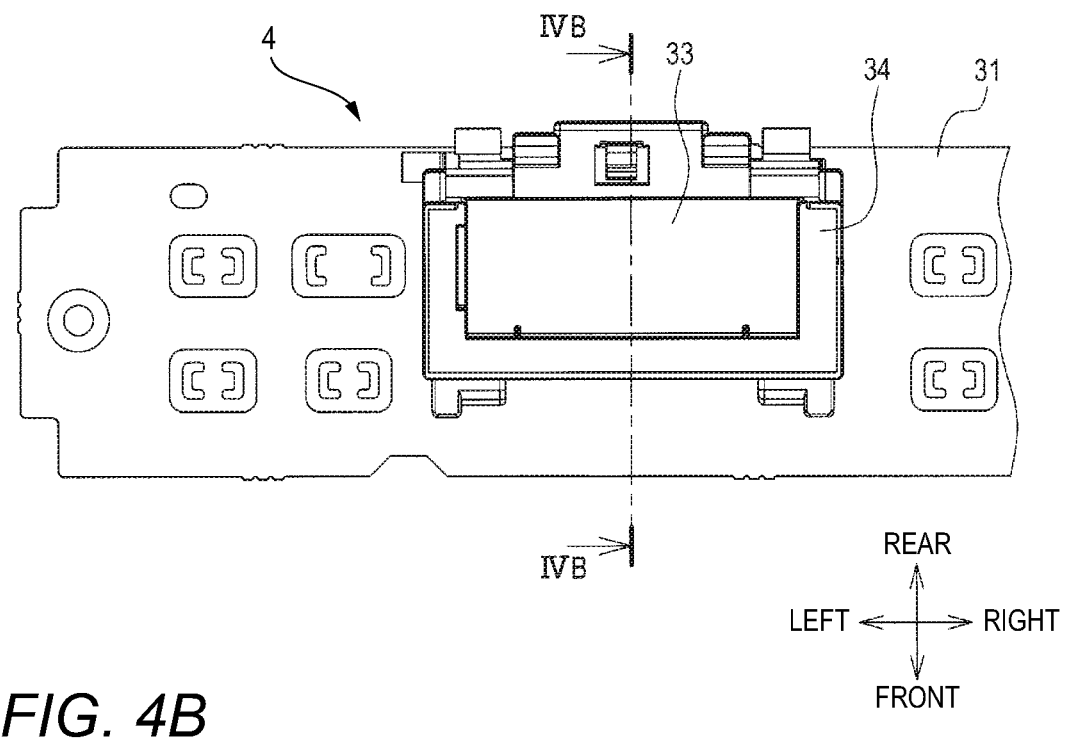
FIG. 4A is a pictorial plan view depicting a display body in the display device of FIG. 2.
Figure 4B:
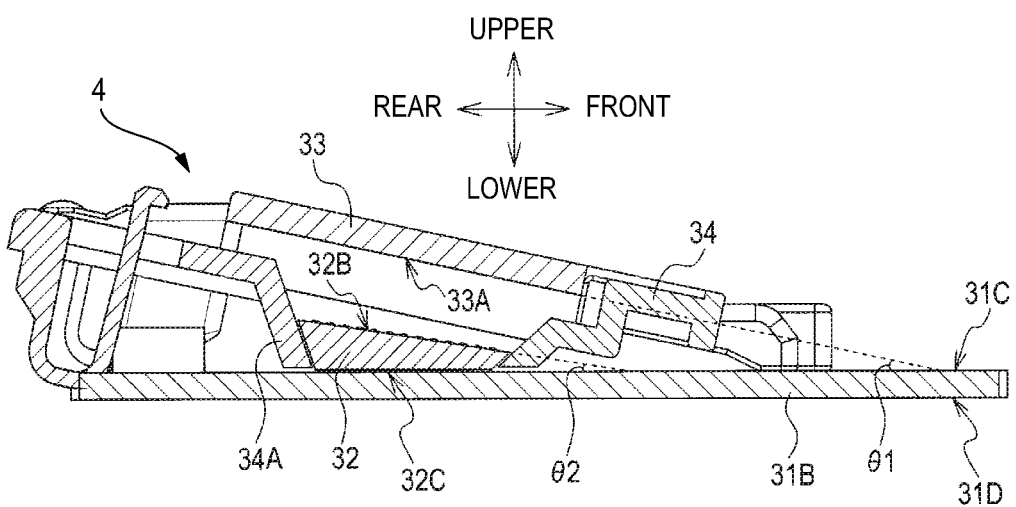
FIG. 4B is a pictorial sectional view taken along a line IVB-IVB of FIG. 4A.

As shown in FIGS. 4A and 4B, the liquid crystal panel 33 is arranged to face the emission surface 32B of the light guide member 32. The liquid crystal panel 33 has a second incidence surface 33A arranged to be inclined relative to the surface 31C of the substrate 31B in a position where the liquid crystal panel 33 faces the emission surface 32B. The second incidence surface 33A is configured by a rear surface (i.e., a surface facing toward the light guide member 32) of the diffusion sheet.

Also, as seen in the optical axis direction of the light source 31A (i.e., the normal direction of the first incidence surface 32A of the light guide member 32), a second angle $\theta 2$ between the emission surface 32B of the light guide member 32 and the surface 31C of the substrate 31B is greater than 0°. Also, the second angle $\theta 2$ is equal to or smaller than a first angle $\theta 1$ between the second incidence surface 33A of the liquid crystal panel 33 and the surface 31C of the substrate 31B.

Thereby, a difference of distances from each of a lower part (i.e., a front part) and an upper part (i.e., a rear part) of inclination of the liquid crystal panel 33 to the emission surface 32B is reduced. The second angle $\theta 2$ is preferably smaller than the first angle $\theta 1$. Thereby, the difference of distances from each of the lower part and the upper part of the liquid crystal panel 33 to the emission surface 32B can be further reduced. Also, since the maximum thickness of the light guide member 32 is reduced, the light guide member 32 can be easily formed.

(Frame)

The frame 34 is a member for holding the liquid crystal panel 33 while spacing the same from the light guide member 32. The frame 34 is fixed to the substrate 31B.

The frame 34 has a reflection member 34A configured to surround surfaces intersecting with the emission surface 32B of the light guide member 32. Specifically, the reflection member 34A has three reflective surfaces each facing the first side surface 32F of the light guide member 32, the second side surface 32G, and a third side surface 32H (refer to FIG. 3A) provided on an opposite side to the first incidence surface 32A. Each of the reflective surfaces is formed with being colored by white, for example.

(Case)

The case 35 is configured to accommodate therein the light source substrate 31, the light guide member 32, the liquid crystal panel 33, and the frame 34. As shown in FIG. 2, the case 35 has a plurality of openings in which operation switches are to be arranged, in addition to an opening 35A to which the liquid crystal panel 33 is to be exposed.

[1-2. Effects]

According to the embodiment as described above, following effects are obtained.

(1a) Since the emission surface 32B of the light guide member 32 is arranged to be inclined relative to the substrate 31B toward the liquid crystal panel 33, it is possible to reduce the difference of distances from each of the lower part and the upper part of inclination of the liquid crystal panel 33 to the emission surface 32B. As a result, while suppressing variations in luminance, it is possible to arrange the liquid crystal panel 33 to be inclined relative to the light source substrate 31.

(1b) Since the light diffusion portions 32D of the light guide member 32 are arranged with being spaced from the liquid crystal panel 33, an unevenness shape due to the light diffusion portions 32D is suppressed from being visually recognized through the liquid crystal panel 33. For this reason, it is possible to improve an appearance of a display part of the display device 3.

(1c) The facing surface 32C of the light guide member 32 is placed on the surface 31C of the substrate 31B, so that positioning of the light guide member 32 and adjustment on the inclination angle of the emission surface 32B can be easily performed.

(1d) The substrate 31B has the white part 31E, so that the light leaked from the facing surface 32C can be returned from the facing surface 32C into the light guide member 32 by reflection on the white part 31E.

(1e) The light guide member 32 has the concave portion 32E, so that it is possible to diffuse the light in a plane direction perpendicular to the first incidence surface 32A in the light guide member 32. Also, the concave portion 32E is formed to range from the emission surface 32B to the facing surface 32C, so that it is possible to diffuse the light over the entire light guide member 32 in the thickness direction.

(1f) Since the area of the facing surface 32C of the light guide member 32 is smaller than the area of the emission surface 32B, it is possible to reduce a mounting area of the light guide member 32 to the substrate 31B while securing the area of the emission surface 32B. As a result, an area of the substrate 31B in which a wiring and other components can be arranged is increased, so that the substrate 31B can be made smaller.

(1g) It is possible to return the light leaked from the side surface of the light guide member 32 into the light guide member 32 by the reflection member 34A.

2. Other Embodiments

Although the embodiment of the present disclosure has been described, the present disclosure is not limited to the embodiment and can take diverse forms.

(2a) In the display device 3 of the embodiment, the light guide member 32 is not necessarily required to be placed on the surface 31C of the substrate 31B. That is, the light guide member 32 may be arranged with being spaced from the surface 31C.

(2b) In the display device 3 of the embodiment, the substrate 31B is not necessarily required to have the white part 31E. Also, the frame 34 is not necessarily required to have the reflection member 34A.

(2c) In the display device 3 of the embodiment, the concave portion 32E of the light guide member 32 is not necessarily required to range from the emission surface 32B to the facing surface 32C. Also, the light guide member 32 is not necessarily required to have the concave portion 32E.

(2d) In the display device 3 of the embodiment, the area of the facing surface 32C of the light guide member 32 may be equal to or greater than the area of the emission surface 32B.

(2e) A function of one constitutional element in the embodiment may be distributed to a plurality of constitutional elements, or functions of a plurality of constitutional elements may be integrated into one constitutional element. Also, a part of the configuration in the embodiment may be omitted. Also, at least a part of the configuration in the embodiment may be added to or replaced with another configuration in the embodiment. In the meantime, all aspects included in the technical spirits specified by the claims are embodiments of the present disclosure.

3. Examples

In the below, a test performed so as to confirm the effects of the present disclosure and evaluations thereof is described.

Figure 5:
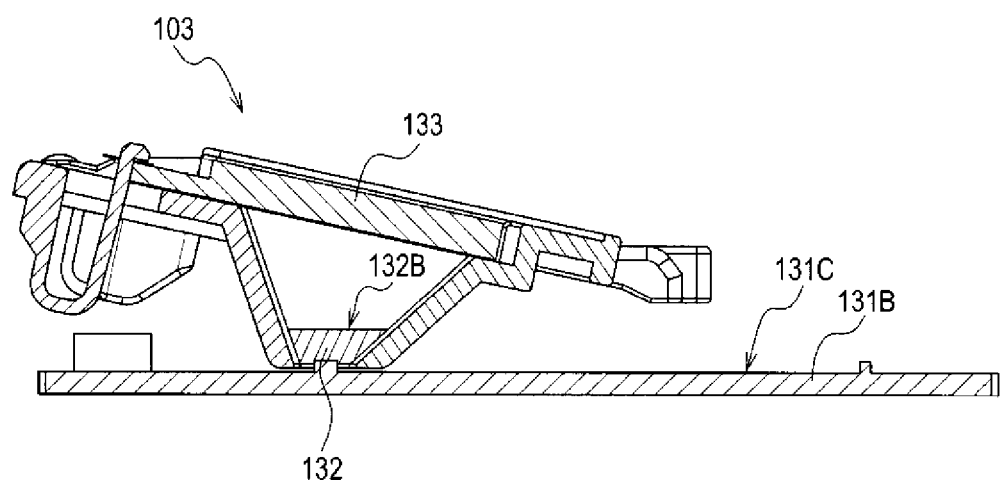
FIG. 5 is a pictorial sectional view of a display device in accordance with Comparative Example.

For the display body 4 of FIG. 4B as Example and a display body 103 of FIG. 5 as Comparative Example, the variations in luminance was obtained by illuminance analysis. In the display body 103 of FIG. 5, an emission surface 132B of a light guide member 132 is spaced from a liquid crystal panel 133 but is parallel to a surface 131C of a substrate 131B. That is, in the display body 103, as seen in the optical axis direction of the light source, the second angle between the emission surface 132B and the surface 131C is 0°.

Figure 6A:
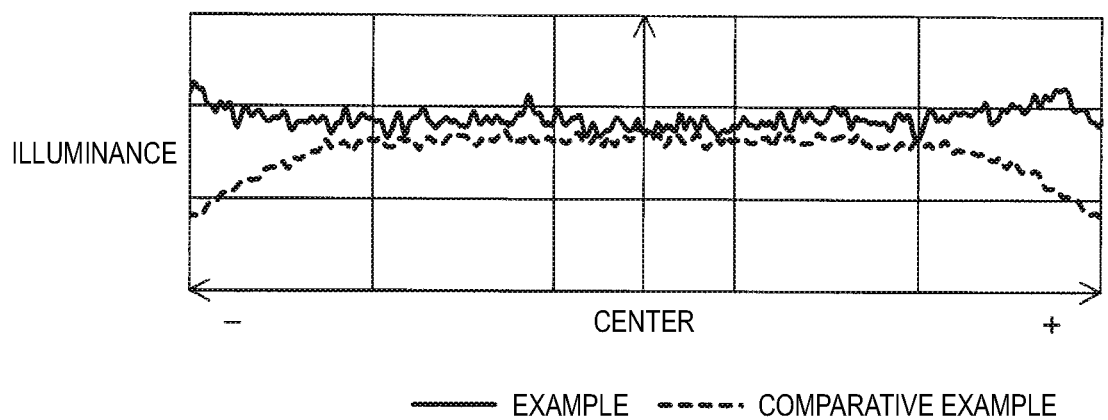
FIG. 6A is a graph depicting a distribution of illuminances in an X direction on a second incidence surface of the liquid crystal panel.
Figure 6B:
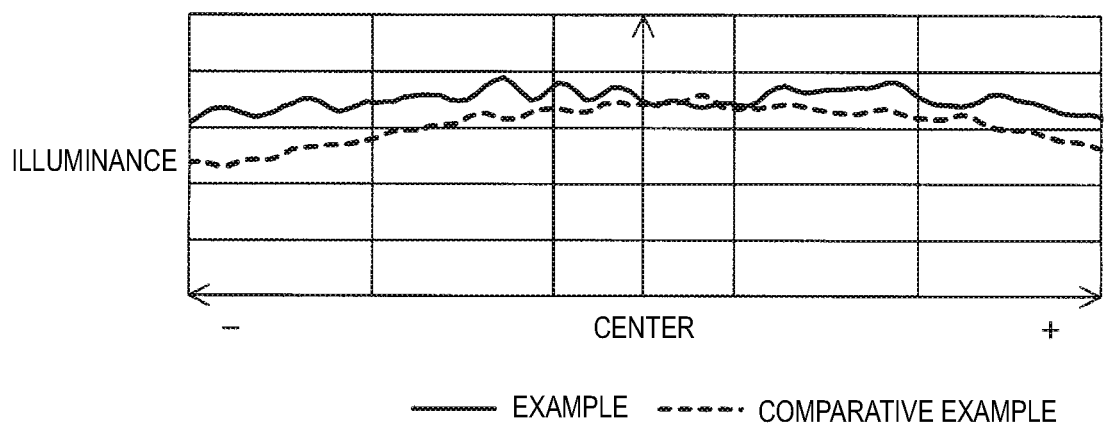
FIG. 6B is a graph depicting a distribution of illuminances in a Y direction on the second incidence surface of the liquid crystal panel.

In Example and Comparative Example, a distribution of illuminances in the X direction (i.e., the right and left direction) on the second incidence surface 33A of the liquid crystal panel 33 is shown in FIG. 6A, and a distribution of illuminances in the Y direction (i.e., the front and rear direction) is shown in FIG. 6B. As can be clearly seen from FIGS. 6A and 6B, the variations in illuminance in Example is smaller than that in Comparative Example, in both the X direction and the Y direction. For this reason, the variations in luminance in the liquid crystal panel 33 is also reduced.

What is claimed is:
1. A display device comprising:
a light guide member having a first incidence surface, and an emission surface orthogonal to the first incidence surface;
a light source substrate having a light source that emits light toward the first incidence surface of the light guide member, and a substrate on which the light source is arranged; and
a liquid crystal panel having a second incidence surface arranged to be inclined relative to a surface of the substrate in a position where the liquid crystal panel faces the emission surface of the light guide member,
wherein the light guide member has convex light diffusion portions arranged on the emission surface, and has a constant thickness in an optical axis direction of the light source,
the light diffusion portions of the light guide member are spaced from the liquid crystal panel, and
a second angle between the emission surface of the light guide member and the surface of the substrate is greater than 0°, and is equal to or smaller than a first angle between the second incidence surface of the liquid crystal panel and the surface of the substrate.
2. The display device according to claim 1,
wherein the light guide member further has a facing surface orthogonal to the first incidence surface, inclined relative to the emission surface, and parallel to the surface of the substrate, and
the facing surface is placed on the surface of the substrate.
3. The display device according to claim 2,
wherein the substrate has a white part provided in a region of the surface facing the facing surface and colored by white.
4. The display device according to claim 2,
wherein the light guide member has a concave portion provided on the first incidence surface, and
the concave portion has a surface facing the light source and orthogonal to the facing surface.
5. The display device according to claim 4,
wherein the concave portion is formed to range from the emission surface to the facing surface.
6. The display device according to claim 2,
wherein an area of the facing surface is smaller than an area of the emission surface.
7. The display device according to claim 1, further comprising:
a reflection member configured to surround surfaces intersecting with the emission surface of the light guide member.
8. The display device according to claim 1,
wherein the second angle is smaller than the first angle.
9. An image forming apparatus comprising the display device according to claim 1.

* * * * *